United States Patent [19]

Baum

[11] Patent Number: 4,740,069
[45] Date of Patent: Apr. 26, 1988

[54] EYEGLASSES FOR INTERMITTENT USE

[76] Inventor: Richard M. Baum, 70 Browers La., Roslyn Heights, N.Y. 11577

[21] Appl. No.: 944,580

[22] Filed: Dec. 22, 1986

[51] Int. Cl.$^4$ .......................... G02C 7/08; G02C 5/14
[52] U.S. Cl. ........................................ 351/57; 351/47; 351/59; 351/119; 351/137
[58] Field of Search ...................... 351/57, 58, 59, 60, 351/128, 115, 93, 63, 67, 69, 119, 124, 137, 44, 47

[56] References Cited

U.S. PATENT DOCUMENTS 3,383,707  5/1968  McNeill ................................ 351/59

FOREIGN PATENT DOCUMENTS 0013221  1/1986  Japan ...................................... 351/63

Primary Examiner—Rodney B. Bovernick
Assistant Examiner—P. M. Dzierzynski
Attorney, Agent, or Firm—James A. Quinton

[57] ABSTRACT

Eyeglasses for intermittent use which can be flat folded and flipped up when not in use, include a cross-bar which extends the width of the eyeglasses. A lens plate is rotatably mounted to the cross bar. Right and left temples extend substantially perpendicularly from opposite ends of the cross bar and are rotatable relative to the lens plate. The temples are composed of a lower temple piece and a temple piece extension. The lower temple pieces extend substantially perpendicularly from opposite ends of the cross-bar. The temple piece extension is rotatably connected to the lower temple piece by for example, a pivot. A nose bridge is located in the middle of the cross bar and is rotatably mounted to the cross bar independent of the rotation lens plate.

14 Claims, 2 Drawing Sheets

EYEGLASSES FOR INTERMITTENT USE

BACKGROUND OF THE INVENTION

1. Field of the Invention

The present invention is directed to eyeglasses which are used intermittently. Examples of eyeglasses for intermittent use include bifocal glasses, sunglasses and reading glasses (magnifiers). More particularly the invention relates to sunglasses which are easy to carry and which have lenses which move into and out of the line of sight of the wearer.

2. Background Art

It is desirable that eyeglasses for intermittent use have lenses that are easily and quickly moveable into and out of the line of sight. In addition such glasses should fold as flat as possible so they may fit in a pocket without unnecessary discomfort.

Flip up eyeglasses and spectacles are known in the art. For example, U.S. Pat. No. 3,990,788 (Choy) discloses spectacles which contain a rotatable shaft and pivotable lens frames. By engaging a knob at the end of the glasses, the shaft is rotated and the lenses pivot out of the line of sight. U.S. Pat. No. 2,582,554 (Mendelsohn) relates to sunglasses, the lenses of which are swingingly mounted to move into and out of the line of sight of the wearer. U.S. Pat. No. 4,154,513 (Goulden) discloses sunglasses wherein the right and left lens are independently adjustable horizontally or vertically. U.S. Pat. No. 4,400,067 (Joffe) discloses 3D glasses, the lenses of which are rotatable into and out of the line of sight of the wearer. Compact folding glasses are also known in the art for example, U.S. Pat. No. 4,560,258. (Stanley).

SUMMARY OF THE INVENTION

It is desirable that eyeglasses for intermittent use have lenses which are easily and quickly moved into and out of the line of sight. Eyeglasses for intermittent use include sunglasses, bifocal glasses and reading glasses (magnifiers). Sunglasses are often used intermittently by the wearer particularly for driving or for use in sporting events such as tennis or baseball or for use on partly cloudy days when there are intermittent periods of bright sun. Since sunglasses are not needed at all times, the user will often carry the glasses in a shirt, coat, or pants pocket. Consequently, eyeglasses for intermittent use should comfortably fit in a shirt, pants or jacket pocket without discomfort to the user.

This invention provides glasses for intermittent use e.g., sunglasses, having lenses that are easily movable into and out of the line of sight of the wearer while the eyeglass frames remain securely attached to the user. When not in use, the glasses of the invention can be folded flat for easy carrying in a pocket.

The glasses of the invention are provided with a cross bar which extends the width of the glasses. A lens plate is rotatably mounted to the cross bar. Right and left temples extend substantially perpendicularly from opposite ends of the cross bar and are rotatable relative to the lens plate. The temples are composed of a lower temple piece and a temple piece extension. The lower temple pieces extend substantially perpendicularly from opposite ends of the cross-bar. The temple piece extension is rotatably connected to the lower temple piece by for example, a pivot. A nose bridge is located in the middle of the cross bar and is rotatably mounted to the cross bar independent of the rotation lens plate.

When the glasses of the subject invention are in use, the temple is straightened by pivoting the temple piece extension on each side of the cross bar so that it is a substantially straight continuation of the lower temple piece. The wearer may freely rotate the lens plate into and out of the line of sight by moving the lens plate up or down. When not in use, the glasses can be folded substantially flat by moving the lens plate to the down position and pulling downward on the lower temple piece to rotate the cross bar relative to lens plate so the lower temples pieces are substantially adjacent to the lens plate. The nose bridge is rotated as necessary so that it is in a flat position relative to the lens plate. The temple piece extensions are pivoted inwardly so that they are substantially perpendicularly to the lower temple piece. The resulting folded glasses are compact and are substantially flat for easy carrying in a pocket.

The preferred embodiment of the present invention is illustrated in the drawings. However, it should be expressly understood that the present invention should not be limited solely to the illustrative embodiment.

BRIEF DESCRIPTION OF THE DRAWINGS

This invention can be better understood with reference to the accompanying drawings.

DETAILED DESCRIPTION OF THE PREFERRED EMBODIMENT

This invention provides glasses for intermittent use which have a cross-bar extending the width of the glasses. A lens plate is rotatably mounted to the cross-bar. Temple pieces extend substantially perpendicularly from each end of the cross-bar. The temples includes a lower temple piece and a temple piece extension. The lower temple pieces extend substantially perpendicularly from opposite ends of the cross-bar and are rotatable relative to the lens plate. The temple piece extensions are pivotably mounted to each lower temple piece. A nose bridge is located in the middle of the cross-bar and is rotatably mounted to the cross-bar independent of the lens plate. In use the lens plate is easily flipped up out of the line of sight by the user while the glass frames remain securely attached to the wearer's head by the nose bridge and temple piece extensions. When not in use the glasses can be easily folded flat.

Figure 1:
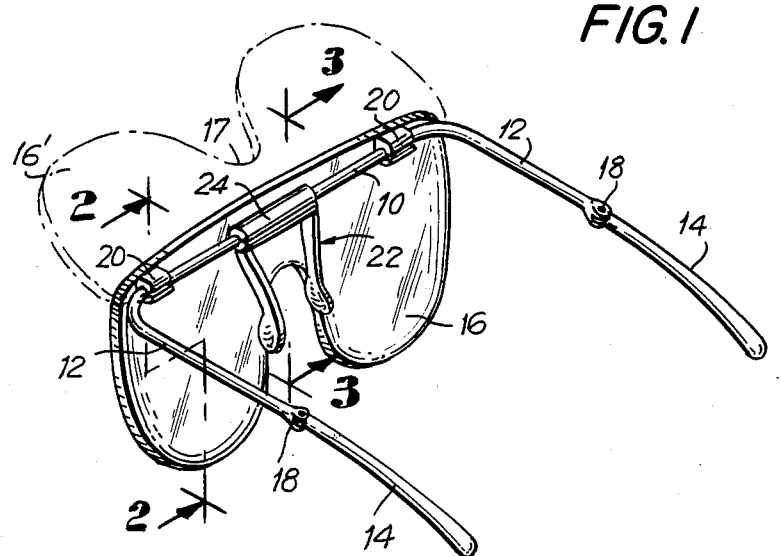
FIG. 1 is a back perspective view of the eyeglasses of the present invention shown in the open position ready for wearing.
Figure 2:
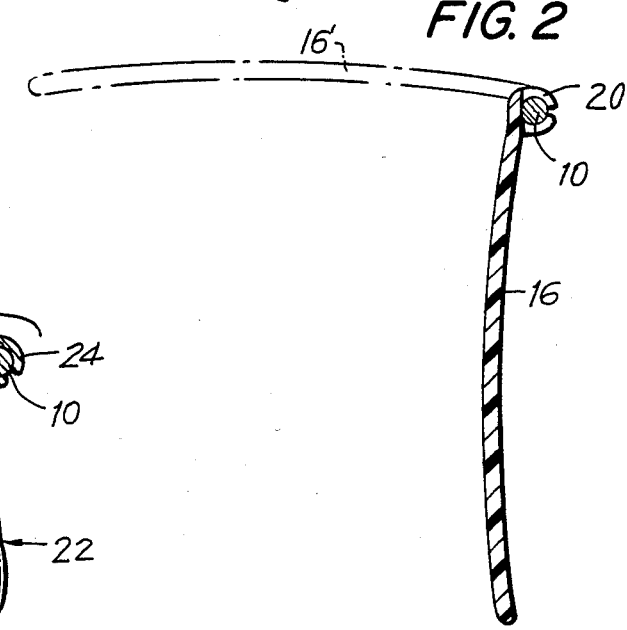
FIG. 2 is a cross-sectional view of the eyeglasses of FIG. 1, through 2—2 of FIG. 1.
Figure 3:
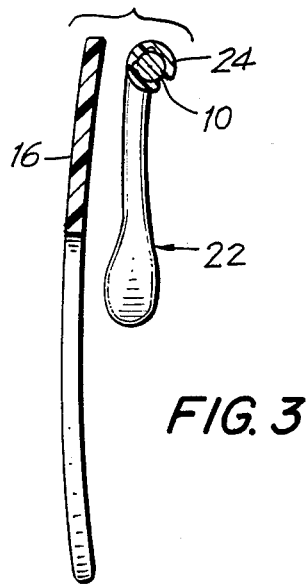
FIG. 3 is a cross-sectional view of the eyeglass of FIG. 1, through 3—3 of FIG. 1.
Figure 4:
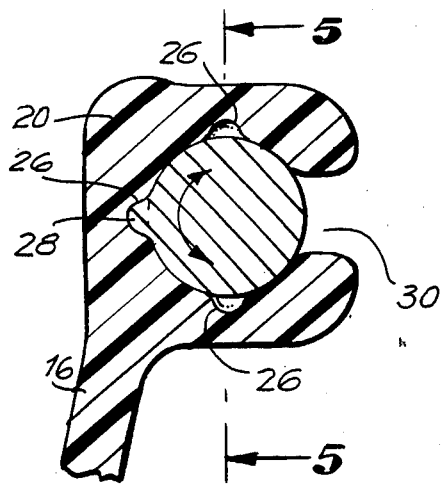
FIG. 4 is a blown up, cross-section showing the clip mechanism for attachment of the lens plate to the cross bar.
Figure 5:
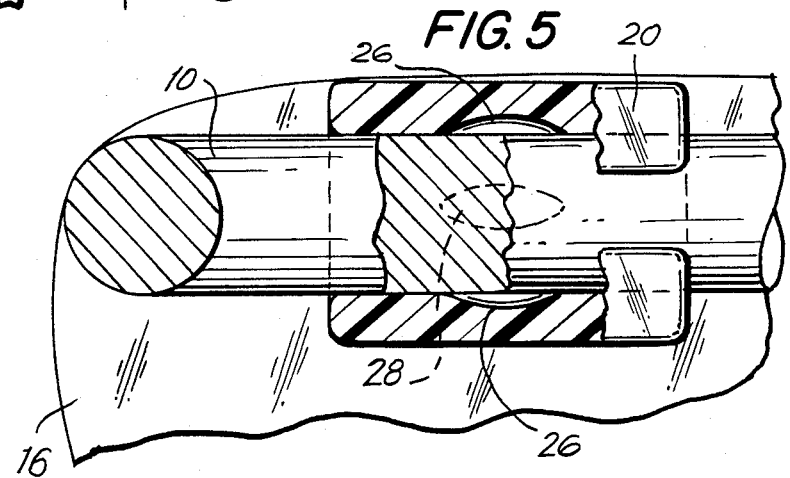
FIG. 5 is a partial cross-sectional view of FIG. 4 through line 5—5.
Figure 6:
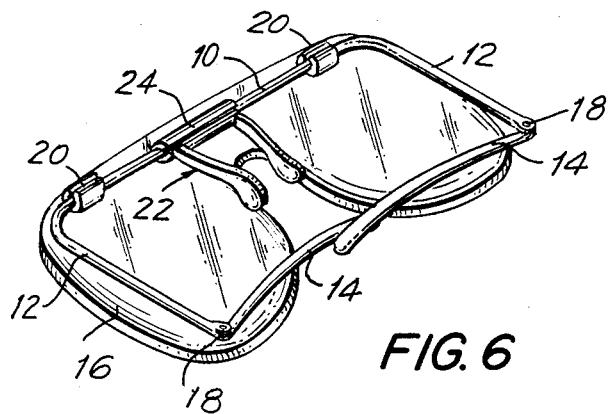
FIG. 6 is a back perspective view of the eyeglasses of the present invention folded flat for carrying.

Referring to the drawings, there is shown a preferred form of the eyeglass of the present invention, generally referred to as 50. As shown in FIG. 1, eyeglasses 50 have a cross-bar, preferably a rod 10, lower temple pieces 12, temple piece extensions 14, lens plate 16 and nose bridge 22. The cross-bar preferably a rod 10 is provided along the length of the glasses. Rod 10 can be made of any convenient material, suitable for eyeglass frames such as plastic or metal. Lens plate 16 which is preferably made of a lightweight plastic material and most preferably is a sun screen, is rotatably mounted to rod 10 preferably at two points by clips 20. Recess 17 is provided in lens plate 16 for receipt of the wearer's nose. As described in more detail below, lens plate 16 is rotatable in three locked positions, a down position shown in FIG. 1, a flipped up position 16' (shown by the phantom lines in FIG. 1 and FIG. 2) and a flat folded position shown in FIG. 6. Temples which are formed by lower temple pieces 12 and temple piece extensions 14 extend substantially perpendicularly from the right and left side of rod 10. The lower temple pieces 12 are preferably integral with rod 10 and preferably are formed for example by bending rod 10 to form a u-bend at either end so that lower temple pieces 12 extend therefrom at approximately a 90 degree angle from rod 10. Alternatively lower temples piece 12 can be attached to rod 10 by other convenient means such as by a hinge as long as the lower temple pieces are rotatable relative to the lens plate 16. Lower temple pieces 12 project from rod 10 a distance which, in the most compact embodiment, is preferably no longer than the vertical dimension of the lens plate 16. Temple piece extensions 14 are rotatably mounted to lower temple pieces 12 by pivot 18 for movement between the open position shown in FIG. 1 and the folded position shown in FIG. 6. At the end opposite if pivot 18, temple piece extensions are curved for comfortable engagement with the wearer's ear. As shown in detail in FIG. 3 nose bridge 22 is rotatably mounted to rod 10 by clamp 24 for rotation of nose bridge 22 independent of any rotation of lens plate 16. Clamp 24 is located in the middle of rod 10 and aligns nose bridge 22 with lens plate recess 17 when the lens plate 16 is in the down position as shown in FIG. 1. Optionally nose pads (not shown) may be provided to nose bridge 22. Clips 20 are secured to the top of lens plate 16 by any convenient means such as gluing and are located on opposite sides of recess 17 preferably near each end of rod 10. Rod 10 fits snugly but rotatably into cavity 30 of each clip 20. As seen in FIG. 4 and FIG. 5, the subject invention preferably includes a detent mechanism to facilitate the rotation of lens plate 16. Clips 20 are provided with three (3) recesses 26 along the wall of cavity 30. Rod 10 is provided with a right and left projection 28 located on the portion of rod 10 that is contained in cavity 30 and which are selectively and removably received by recesses 26 so that the lens plate 16 and rod 10 can be selectively rotated relative to one another into three locked positions (flipped up, down and flat folded). As shown in FIG. 4, when the lens plate 16 is in the down (ready to use) position of FIG. 1, right and left projections 28 lie in their respective middle recess 26. When the lens plate 16 is flipped up to 16', projection 28 moves downwardly into lower recess 26. When the glasses are flat folded as shown in FIG. 6, right and left projection 28 moves upwardly into the upper recess 26.

As shown in FIG. 1, in use, the wearer can easily move the lens plate 16 into and out of the line of sight by rotating the lens plate 16 up or down as desired. Right and left projections 28 on rod 10 moves into the desired recess 26 in clip 20 to lock lens plate 16 into the desired position. Thus, the lens plate 16 and clips 20 move relative to the rod 10. To fold the glasses flat, as shown in FIG. 6, the lens screen 16 is first rotated to its down position. Then the lower temples pieces 12 are pulled downward so that the lower temple pieces are substantially adjacent to the lens plate 16 and preferably abutting the lens plate 16. As a result, rod 10 rotates and right and left projections 28 move into the upper recess 26. Temple piece extensions 14 are then rotated inwardly about pivot 18 so they are substantially perpendicular to lower temple piece 12. Nose bridge 22 is rotated as necessary to place it in a flat abutting relationship with lens plate 16. The resulting flat folded eyeglasses are compact and easily carried in a pants, shirt or coat pocket.

It should be understood by those skilled in the art that various modifications may be made in the present invention without departing from the spirit and scope thereof, as described in the specification and defined in the appended claims.

I claim:

1. Flat folding flip up eyeglasses for intermittent use comprising
    a cross-bar extending the width of said eyeglasses;
    a lens plate rotatably mounted to said cross-bar for selective rotation of said lens plate to a flipped up position, down position and flat folded position;
    a nose bridge rotatably mounted to said cross-bar for rotation independent of the rotation of said lens plate;
    lower temple pieces extending substantially perpendicularly from opposite ends of said cross-bar; said lower temple pieces in substantially perpendicular relation to said lens plate when lens plate is in the down position;
    means to rotate the lower temple pieces relative to the lens plate when said lens plate is in the down position from a position perpendicular to said lens plate to a position adjacent to said lens plate;
    temple piece extensions rotatably mounted to each lower temple piece so that said temple piece extensions can be rotated inwardly to a substantially perpendicular position relative to said lower temple pieces when said glasses are flat folded and rotated outwardly to a position which is a substantially straight extension of said lower temple pieces when the glasses are in use, said temple piece extensions adapted at one end for engagement with the ears of the user.

2. The eyeglasses of claim 1 wherein said eyeglasses are sunglasses.

3. The eyeglasses of claim 1, wherein said eyeglasses are selected from the group consisting of sunglasses, bifocal glasses and reading glasses.

4. The eyeglasses of claim 3, wherein said cross-bar is a rod.

5. The eyeglases of claim 4 wherein said eyeglasses are sunglasses.

6. The eyeglasses of claim 4, wherein said lower temple pieces are integral with said rod.

7. The eyeglasses of claim 4, further comprising two clips mounted on opposite ends of said lens plate, said clips having a cavity adapted for receipt of said rod; said cavity having a first, second and third recess; said rod having a projection adapted for releasable engagement in said recesses so that when said lens plate is in the up position said projection is received by the first recess, when said lens plate is in the down position said projection is received by the second recess and when said lens plate is in the flat fold position said projection is received by said third recess.

8. The eyeglasses of claim 7 wherein said eyeglasses are sunglasses.

9. The eyeglasses of claim 6, wherein said lower temple pieces extend a distance from said rod which is equal to or less than the vertical dimension of said lens plate.

10. The eyeglasses of claim 6 wherein said eyeglasses are sunglasses.

11. The eyeglasses of claim 9, wherein said lower temple pieces are rotable from a position substantially perpendicular to said lens plate to a position abutting said lens plate.

12. The eyeglasses of claim 9 wherein said eyeglasses are sunglasses.

13. The eyeglasses of claim 11 wherein said eyeglasses are sunglasses.

14. Sunglasses comprising
a rod extending the width of said sunglasses;
a lens plate;
a right and left clip attached to said lens plate for rotatably connecting said lens plate to said rod;
said clips having a cavity adapted for receipt of said rod;
three recesses located in the cavity of said clip;
a right and left projection located on said rod for receipt by said recesses in said cavity of said right and left clip to selectively lock said lens plate in a flipped up, down or flat folded position;
a nose bridge rotatably mounted to said rod for rotation independent of the rotation of said lens plate;
lower temple pieces extending from opposite ends of said rod and integral therewith, said lower temple pieces extending substantially perpendicularly from said rod and located substantially perpendicular to said lens plate when said lens plate is in its down position and located substantially adjacent to said lens plate when said lens plate is in its flat folded position;
temple piece extensions rotatably mounted to each lower temple piece so that said temple piece extensions can be rotated inwardly to a substantially perpendicular position relative to said lower temple pieces when said sunglasses are flat folded and rotated outwardly to a position which is a substantially straight extension of said lower temple pieces when the sunglasses are in use, said temple piece extensions adapted at one end for engagement with the ears of the user.

* * * * *